US006468339B1

(12) United States Patent
Taylor et al.

(10) Patent No.: US 6,468,339 B1
(45) Date of Patent: Oct. 22, 2002

(54) ALUMINA FILLED GELATIN

(75) Inventors: Jeffrey F. Taylor, Mount Pleasant, PA (US); Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/935,529

(22) Filed: Aug. 23, 2001

(51) Int. Cl.[7] .......................... C09D 191/00; G03C 1/00

(52) U.S. Cl. ............................ 106/157.18; 106/154.11; 430/449; 430/451; 430/496; 430/539

(58) Field of Search ....................... 106/154.11, 157.18; 430/449, 451, 496, 539

(56) References Cited

U.S. PATENT DOCUMENTS

| | | | | |
|---|---|---|---|---|
| 2,454,043 A | | 11/1948 | Dimsdale et al. | |
| 2,588,765 A | | 3/1952 | Robijns | |
| 2,732,305 A | | 1/1956 | Richman et al. | |
| 2,761,791 A | | 9/1956 | Russell | |
| 2,976,148 A | | 3/1961 | Walford | |
| 3,042,222 A | | 7/1962 | Lehmann | |
| 3,042,522 A | | 7/1962 | Ben-Ezra | |
| 3,080,317 A | | 3/1963 | Tallet et al. | |
| 3,121,060 A | | 2/1964 | Duane | |
| 3,206,311 A | | 9/1965 | Campbell et al. | |
| 3,489,567 A | | 1/1970 | McGraw | |
| 3,502,473 A | | 3/1970 | Snellman et al. | |
| 3,508,947 A | | 4/1970 | Hughes | |
| 3,880,665 A | | 4/1975 | Himmelmann | |
| 3,933,516 A | | 1/1976 | Mackey | |
| 4,004,927 A | | 1/1977 | Yamamoto et al. | |
| 4,047,958 A | | 9/1977 | Yoneyama et al. | |
| 4,063,952 A | | 12/1977 | Himmelmann et al. | |
| 4,067,741 A | | 1/1978 | Bergthaller et al. | |
| 4,173,481 A | * | 11/1979 | Sera et al. | 106/154.11 |
| 4,279,945 A | | 7/1981 | Audran et al. | |
| 4,302,523 A | | 11/1981 | Audran et al. | |
| 4,427,964 A | | 1/1984 | Ruegsegger | |
| 4,673,632 A | | 6/1987 | Okamura et al. | |
| 5,853,965 A | | 12/1998 | Haydock et al. | |
| 5,866,282 A | | 2/1999 | Bourdelais et al. | |
| 5,874,205 A | | 2/1999 | Bourdelais et al. | |
| 5,888,643 A | | 3/1999 | Aylward et al. | |
| 5,888,681 A | | 3/1999 | Gula et al. | |
| 5,888,683 A | | 3/1999 | Gula et al. | |
| 5,888,714 A | | 3/1999 | Bourdelais et al. | |

FOREIGN PATENT DOCUMENTS

| | | |
|---|---|---|
| BE | 825726 | 8/1975 |
| DE | 1284295 | 11/1968 |
| DE | 1284894 | 11/1968 |
| GB | 955061 | 4/1964 |
| GB | 974723 | 11/1964 |
| GB | 1143118 | 2/1969 |
| GB | 1167207 | 10/1969 |
| GB | 1198387 | 7/1970 |
| GB | 1263722 | 2/1972 |
| GB | 1320565 | 6/1973 |
| GB | 1320756 | 6/1973 |
| GB | 1320757 | 6/1973 |
| GB | 1430997 | 4/1976 |
| GB | 1466304 | 3/1977 |

OTHER PUBLICATIONS

Research Disclosure, Item No. 308119, (12/89), pp. 1008–1009.
Research Disclosure, Item No. 36230, (06/94).
Research Disclosure, Item No. 17643, (12/78), vol. 176.
Research Disclosure, Item No. 37038, pp. 96–98 (Feb. 1995).
Research Disclosure, Item No. 38957 (Sep. 1996).
Research Disclosure, Item No. 34390, (11/92).

* cited by examiner

*Primary Examiner*—David Brunsman
(74) *Attorney, Agent, or Firm*—Doreen M. Wells

(57) ABSTRACT

A gelatin based photographic coating contains at least gelatin and colloidal alumina particles less than 0.2 μm. Additionally, the coating may contain any photographic addenda that may be important to the performance of a photographic product, as well as a chemical hardening agent that forms crosslinks in the coating. The alumina filled gelatin coating, when swollen with water or a photo processing solution yields an increase in wet durability in the form of an increased wet scratch resistance.

21 Claims, No Drawings

ALUMINA FILLED GELATIN

FIELD OF THE INVENTION

The present invention involves photographic emulsions, particularly filled gelatin based emulsions that confer wet scratch resistance when coated on a support.

BACKGROUND OF THE INVENTION

In the photographic industry, gelatin based emulsions are often used to coat layers on a support. A gelatin based emulsion consists of a gelatin matrix and various photographic fillers or inclusions are present to perform the imaging capabilities of the coating. The gelatin is used as the matrix due to its properties in the dry and wet state. One of the key properties of gelatin that makes it a useful material for a photographic emulsion, is its ability to swell with water or a developing solution. This property of the coating is critical to allow the emulsion to be wet processed. To resist complete dissolution of the coating when swollen, chemical hardeners such as bis vinyl sulfonyl methane are often added.

When the coating is swollen, the material is a soft gel. Due to the soft nature of the coating, durability of the coating can be a problem during handling and transport through high speed processing units. One method to quantify the durability of an emulsion based coating is by measuring the wet scratch resistance. This is done by determining the load required to form a scratch of continuous plow in a fully swollen coating. To understand the problem, it must be realized that (i) a photographic emulsion is a gelatin matrix composite material, and (ii) the modulus (or the material's ability to withstand deformation) is very low in the swollen state. A high modulus material is stiff and glassy like, while a low modulus material is soft, compliant, and rubber like. A swollen gelatin based coating behaves as a low modulus rubber.

It would be advantageous to create a coating that would have high resistance to wet scratch, thus allowing for fewer defects during processing as well as allowing for processing labs to relax on the stringent care and maintenance in a processing unit.

SUMMARY OF THE INVENTION

The present invention increases the scratch resistance of a gelatin based coating which, as described above, becomes soft and rubbery when wet. Thus, the present invention discloses a coating composition comprising at least gelatin and colloidal alumina particles, the particles being less than 0.2 micrometers. The composition can be used in an imaging element comprising a support and at least one imaging layer, wherein the element contains, in any gelatin containing layer, colloidal alumina particles less than 0.2 micrometers. Also disclosed is a method of increasing the wet strength of a coated gelatin layer comprising the steps of: providing alumina particles having an average size of less than 0.2 micrometers; adding the alumina particles to gelatin at a pH between 3.5 and 7.0 to form a coating composition; adjusting the pH of the composition to a level required for coating; and coating the composition on a support.

The gelatin based photographic coating of the invention contains at least gelatin and colloidal alumina particles. Optionally, the coating may contain any photographic addenda that may be important to a photographic product, as well as a chemical hardening agent that will form crosslinks in the gelatin. The coating, when swollen with water or a photo processing solution, shows an increase in wet durability as demonstrated by increased wet scratch resistance. It is expected that the colloidal alumina may be placed throughout the entire coating package, or in selected layers that would require mechanical reinforcement in a scratch environment.

DETAILED DESCRIPTION OF THE INVENTION

Wet scratch resistance of a flexible coating, in particular a multilayer coating, will relate to two parameters. The first is the stress in the coating as a result of the scratching stylus or asperity. This stress is frequently found in the bottom layers of the package, and is primarily due to the mismatch in modulus between the glassy support or substrate, and the soft gelatin coating. To minimize this stress, it is advantageous to decrease the mismatch in modulus by increasing the modulus of the (bottom layer) swollen coating. This can be done by incorporation of a hard material or high modulus filler. The other parameter of importance to wet scratch is the failure strength. This failure occurs cohesively in the coating. High modulus fillers in a gelatin based coating should help to minimize the stresses in the coating; however, if the chemical interactions between the gelatin matrix and rigid filler are weak, these inclusions will simply lower the failure strength of the material. Therefore, it is important to find a high modulus filler with strong chemical interactions at the filler/matrix interface.

One such filler material is alumina particles. In the swollen state, alumina particles will maintain a high modulus and increase the overall modulus of the entire coating. Additionally, it is known that at the polar aluminum oxide surface, carboxylic acid containing molecules exchange for the surface hydroxyl groups to form strong bonds (Environmental Science and Technology 1988, 22(1), 37–41). Since gelatin contains a high number of carboxylic acid groups, the interfacial interaction between gelatin and alumina should be high.

Alumina particles used in the practice of this invention as reinforcing filler particles have a median diameter less than 0.2 micrometers, preferably less than 0.15 micrometers and most preferably less than 0.1 micrometers. As a practical matter, the minimum median diameter is 0.04 micrometers. The filler particles preferably have a Mohs hardness greater than 6 and are present in an amount of from 5 to 60 percent by weight and preferably from 10 to 50 percent and most preferably from 20 to 45 percent based on the weight of the binder. A specific example of the filler particles is $\gamma$-alumina. These can also be pre-dispersed in water with or without a dispersant using media milling and then incorporated into the coating composition.

In accordance with a preferred embodiment of this invention, the gelatin containing alumina samples were prepared by first media milling the alumina in water until the appropriate size (less than 0.2 micrometers) was obtained. The resulting slurry was next added to gelatin at a pH of 3.5 and 7.0, preferably 4.0, at a ratio of 1:1 gelatin:alumina to ensure good interaction between gelatin and alumina. Ideally, the pH should be less 4.5.

As used herein the term "gelatin" includes gelatin and gelatin derivatives such as gelatin derivatized with aromatic sulfonyl chlorides, carboxylic acid chlorides, carboxylic acid anhydrides, aryl isocyanates, etc. Gelatin may be any of so-called alkali treated (lime treated) gelatin which was immersed in an alkali bath prior to extraction thereof, an acid treated gelatin which was immersed in an acid bath prior to extraction thereof, an acid treated gelatin that was immersed in both baths and enzyme treated gelatin.

The alumina filled gelatin layer of the present invention is preferably hardened. Hardeners usable for hardening gelatin layers include, for example, aldehyde compounds such as formaldehyde and glutaraldehyde; ketone compounds such as diacetyl and cyclopentanedione; compounds having reactive halogens such as bis(2-chloroethylurea), 2-hydroxy-4, 6-dichloro-1,3,5-trizine and those described in U.S. Pat. Nos. 3,288,775 and 2,732,303 and British Patent Nos. 974,723 and 1,167,207; divinylsulfone, 5-acetyl-1,3-diacrylolhexahydro-1,3,5-triazine and reactive olefin-containing compounds such as divinylsulfone, 5-acetyl-1,2-diacryloyl-hexahydro-1,3,5-triazine, and the compounds such as divinylsulfone, 5-acetyl-1,3-diacryloyl-hexahydro-1,3,5-triazine, and the compounds disclosed in U.S. Pat. Nos. 3,635,718 and 3,232,763, and British Patent 994,869; N-hydroxymethylothalimide; N-methylol compounds such as N-hydroxymethylphthalimide and those described in U.S. Pat. Nos. 2,732,316 and 2,586,168; isocyanates described in U.S. Pat. Nos. 3,103,437; the aziridines disclosed in U.S. Pat. Nos. 3,017,280 and 2,983,611; acid derivatives described in U.S. Pat Nos. 2,725,294 and 2,725,295; epoxy compounds described in U.S. Pat. No. 3,091,537; and halogenated carboxyaldehydes such as mucochloric acid. Examples of inorganic hardeners include chrome alum, zirconium sulfate and the carboxyl group activating hardeners described in Japanese Patent Publication for opposition purpose (herein after referred to as J. P. Kokoku) Nos. 56-12853 and 58-32699, Belgian Patent No. 825,726, J. P. Kokai Nos. 60-225148 and 51-126,125, J. P. Kokoku No. 5850699, J. P. Kokai No. 5254427 and U.S. Pat. No. 3,321,313. The hardener is generally used in an amount from 0.01 to 30 weight %, preferably from 0.05 to 20 weight %, and most preferably 0.1 to 0.14 weight %, to the amount of dried gelatin.

Other addenda include couplers, silver salts, dyes, hardeners, surfactants, matte particles, lubricants, viscosity modifiers and the like. Surfactants include any surface-active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly(glycidol) available from Olin Matheson Corporation or sodium octylphenoxypoly(ethyleneoxide) sulfate, organic sulfates or sulfonates, such as sodium dodecyl sulfate, sodium dodecyl sulfonate, sodium bis(2-ethylhexyl)sulfosuccinate (Aerosol OT), and alkylcarboxylate salts such as sodium decanoate.

Matte particles well known in the art may also be used in the coating composition of the invention, such matting agents have been described in Research Disclosure No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particle, to the coated layers. Suitable reactive functional groups include hydroxyl, carboxyl, carbodiimide, epoxide, aziridine, vinyl sulfone, sulfinic acid, active methylene, amino, amide, allyl, and the like.

In order to reduce the sliding friction of the photographic elements in accordance with this invention, the outermost layer of the element may contain fluorinated or siloxane-based components and/or the coating composition may also include lubricants or combinations of lubricants. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118;

(2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565, and 1,320,756; and in German Patent Nos. 1,284,295 and 1,284,294, (3) liquid paraffin and paraffin or wax like materials such as camauba wax, natural and synthetic waxes, petroleum waxes, mineral waxes, silicone-wax copolymers and the like; (4) per-fluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth) acrylamides containing perfluoroalkyl side groups, and the like. Lubricants useful in the present invention are described in further detail in Research Disclosure No. 308119, published December 1989, page 1006.

The support material used with this invention can comprise various polymeric films, papers, glass, and the like. The thickness of the support is not critical. Support thicknesses of 2 to 15 mile (0.002 to 0.015 inches) can be used. Biaxially oriented support laminates can be used with the present invention. These supports are disclosed in commonly owned U.S. Pat. Nos. 5,853,965, 5,866,282, 5,874,205, 5,888,643, 5,888,681, 5,888,683, and 5,888,714, incorporated in their entirety by reference herein. These supports include a paper base and a biaxially oriented polyolefin sheet, typically polypropylene, laminated to one or both sides of the paper base. At least one photosensitive silver halide layer is applied to the biaxially oriented polyolefin sheet.

The coating composition of the invention can be applied by any of a number of well known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published December 1989, pages 1007 to 1008.

Photographic elements can contain conductive layers incorporated into multilayer photographic elements in any of various configurations depending upon the requirements of the specific photographic element. Preferably, the conductive layer is present as a subbing or tie layer underlying a magnetic recording layer on the side of the support opposite the photographic layer(s). However, conductive layers can be overcoated with layers other than a transparent magnetic recording layer (e.g., abrasion-resistant backing layer, curl control layer, pelloid, etc.) in order to minimize the increase in the resistivity of the conductive layer after overcoating. Further, additional conductive layers also can be provided on the same side of the support as the photographic layer(s) or on both sides of the support. An optional conductive subbing layer can be applied either underlying or overlying a gelatin subbing layer containing an antihalation dye or pigment. Alternatively, both antihalation and antistatic functions can be combined in a single layer containing conductive particles, antihalation dye, and a binder. Such a hybrid layer is typically coated on the same side of the support as the sensitized emulsion layer. Additional optional layers can be present as well. An additional conductive layer can be used as an outermost layer of a photographic element, for example, as a protective layer overlying an image-forming layer. When a conductive layer is applied over a sensitized emulsion layer, it is not necessary to apply any intermediate layers such as barrier or adhesion-promoting layers between the conductive overcoat layer and the photographic layer(s), although they can optionally be present. Other addenda, such as polymer lattices to improve dimensional stability, hardeners or cross-linking agents, surfactants, matting agents, lubricants, and various other well known additives can be present in any or all of the above mentioned layers. Conductive layers underlying a transparent magnetic recording layer typically exhibit an internal resistivity of less than $1 \times 10^{10}$ ohms/square, preferably less than $1 \times 10^{9}$ ohms/square, and more preferably, less than $1 \times 10^{8}$ ohms/square.

Photographic elements of this invention can differ widely in structure and composition. For example, the photographic elements can vary greatly with regard to the type of support, the number and composition of the image-forming layers, and the number and types of auxiliary layers that are included in the elements. In particular, photographic elements can be still films, motion picture films, x-ray films, graphic arts films, paper prints or microfiche. It is also specifically contemplated to use the conductive layer of the present invention in small format films as described in Research Disclosure, Item 36230 (June 1994). Photographic elements can be either simple black-and-white or monochrome elements or multilayer and/or multicolor elements adapted for use in a negative-positive process or a reversal process. Generally, the photographic element is prepared by coating one side of the film or paper support with one or more layers comprising a dispersion of silver halide crystals in an aqueous solution of gelatin and optionally one or more subbing layers. The coating process can be carried out on a continuously operating coating machine wherein a single layer or a plurality of layers are applied to the support. For multicolor elements, layers can be coated simultaneously on the composite film support as described in U.S. Pat. Nos. 2,761,791 and 3,508,947. Additional useful coating and drying procedures are described in Research Disclosure, Vol. 176, Item 17643 (December, 1978).

Photographic elements protected in accordance with this invention may be derived from silver-halide photographic elements that can be black and white elements (for example, those which yield a silver image or those which yield a neutral tone image from a mixture of dye forming couplers), single color elements or multicolor elements. Multicolor elements typically contain dye image-forming units sensitive to each of the three primary regions of the spectrum. The imaged elements can be imaged elements which are viewed by transmission, such as negative film images, reversal film images and motion-picture prints or they can be imaged elements that are viewed by reflection, such a paper prints.

Photographic elements of this invention can have the structures and components shown in Research Disclosures 37038 and 38957. Other structures which are useful in this invention are disclosed in commonly owned U.S. Ser. No. 09/299,395, filed Apr. 26, 1999 and U.S. Ser. No. 09/299,548, filed Apr. 26, 1999, incorporated in their entirety by reference. Specific photographic elements can be those shown on pages 96–98 of Research Disclosure 37038 as Color Paper Elements 1 and 2. A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler.

The photographic element can contain additional layers, such as filter layers, interlayers, overcoat layers, subbing layers, and the like. All of these can be coated on a support that can be transparent (for example, a film support) or reflective (for example, a paper support). Photographic elements protected in accordance with the present invention may also include a magnetic recording material as described in Research Disclosure, Item 34390, November 1992, or a transparent magnetic recording layer such as a layer containing magnetic particles on the underside of a transparent support as described in U.S. Pat. No. 4,279,945 and U.S. Pat. No. 4,302,523.

Suitable silver halide emulsions and their preparation, as well as methods of chemical and spectral sensitization, are described in Sections I through V of Research Disclosures 37038 and 38957. Others are described in U.S. Ser. No. 09/299,395, filed Apr. 26, 1999 and U.S. Ser. No. 09/299,548, filed Apr. 26, 1999, which are incorporated in their entirety by reference herein. Color materials and development modifiers are described in Sections V through XX of Research Disclosures 37038 and 38957. Vehicles are described in Section II of Research Disclosures 37038 and 38957, and various additives such as brighteners, antifoggants, stabilizers, light absorbing and scattering materials, hardeners, coating aids, plasticizers, lubricants and matting agents are described in Sections VI through X and XI through XIV of Research Disclosures 37038 and 38957. Processing methods and agents are described in Sections XIX and XX of Research Disclosures 37038 and 38957, and methods of exposure are described in Section XVI of Research Disclosures 37038 and 38957.

Photographic elements typically provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, pithalated gelatin, and the like). Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

Images can be developed in photographic elements in any of a number of well known photographic processes utilizing any of a number of well known processing compositions, described, for example, in T. H. James, editor, The Theory of the Photographic Process, 4th Edition, Macmillan, New York, 1977. In the case of processing a color negative element, the element is treated with a color developer (that is one which will form the colored image dyes with the color couplers), and then with an oxidizer and a solvent to remove silver and silver halide. In the case of processing a color reversal element, the element is first treated with a black and white developer (that is, a developer which does not form colored dyes with the coupler compounds) followed by a treatment to render developable unexposed silver halide (usually chemical or light fogging), followed by treatment with a color developer. Development is followed by bleach-fixing, to remove silver or silver halide, washing and drying.

The following Examples further describe the invention in detail, but it should not be construed that the present invention is limited thereto.

EXAMPLES

Sample Preparation

An alumina dispersion in water was prepared at a concentration of 20% by weight alumina by media milling γ-alumina particles in water until the desired particle size was obtained. This was added to regular Type IV de-ionized gelatin in water (pH adjusted to 4) at 40° C. with very good mixing until a 1:1 ratio of gelatin and alumina was achieved. The preparation of this solution was done to allow for the interaction between gelatin and alumina to be done in a controlled environment. This mixture was then added with stirring to more gelatin dissolved in water at 40° C. to get the desired ratio of gelatin to alumina as shown in Table 1. The pH was adjusted to 5.4. A surfactant, nonylphenoxy polyglycerol, (obtained from Olin under the trade name of Olin 10 G) was added as a coating aid. The final solution was 5.5 wt. % gelatin, 1 wt. % surfactant, and a given amount of alumina and hardeners specified in Table 1. These solutions were coated on a subbed 7 mil polyester support. A hardener solution was dual mixed during coating. The hardener (HAR) used was bis vinyl sulfonyl methane. The final coating compositions are presented in Table 1. The amount of gelatin in the final coating was 10.76 g/m$^2$. The amount of alumina in the final coating was 0, 10, 20, 30, 40 wt % relative to the gelatin.

TABLE 1

| Example # | Alumina Wt. % (with respect to gelatin) | Particle size (nanometers) | HAR wt. % (with respect to gelatin) |
|---|---|---|---|
| 1 (control) | 0 | 0 | 0.75 |
| 2 (control) | 0 | 0 | 1.5 |
| 3 (control) | 0 | 0 | 3.0 |
| 4 | 10 | 107 | 1.5 |
| 5 | 20 | 107 | 1.5 |
| 6 | 30 | 107 | 1.5 |
| 7 | 40 | 107 | 1.5 |
| 8 | 10 | 70 | 1.5 |
| 9 | 20 | 70 | 1.5 |
| 10 | 30 | 70 | 1.5 |

Assessment of the Coatings

Wet Scratch Resistance

A wet scratch test was used to measure the scratch resistance of the swollen sample. The test is carried out by submerging a sample coating or photographic film in a swelling agent. The swelling agent in this study was a photographic developer solution. The temperature was held constant at 39° C. A spherical-jewel stylus is dragged across the swollen sample while the normal load is linearly increased with the distance dragged. At some distance along the sample, a scratch formed. The value is taken at the point that a continual scratch is formed as observed by the naked eye. This value is reported in "grains to plow".

Gravimetric Swell

The gravimetric swell was measured by cutting out two samples from each of the above listed coatings. These samples were left in a dessicatorjar overnight to remove any excess moisture. The samples were removed from the jar, and weighed. These samples were placed in a water bath held at a temperature of 40° C. for 5 minutes. The bath was mixed during the swelling time. The samples were removed. The excess water was removed by passing the sample through two squeegee rollers. The samples were then weighed. The gravimetric swell is stated as the amount of water picked up per area of sample (g/m$^2$).

The results of these two tests for Examples 1–10 are given in Table 2. In all cases where equivalent HAR content is used, samples containing alumina particles, examples 4–10, yielded an increase in wet scratch resistance, as well as a decrease in swell compared to the equivalent control, example 2. An improvement in durability of the control was obtained only upon increasing the HAR level of the coating (example 3). However, from the point of view of cost, coating issues and developability kinetics, raising the level of the HAR crosslinker is not desirable. It can also be concluded from Table 2 that increasing the loading of alumina in the layer decreases the swell and increases the scratch resistance. The particle size of alumina also influences durability of the coating in that the particle size increases the wet scratch resistance over the larger particles. Table 2 illustrates that the incorporation of alumina in the coating increases the wet durability.

TABLE 2

| Example # | Alumina wt. % (with respect to gelatin) | Particle Size (nanometers) | BVSM wt. % (with respect to gelatin) | Wet Scratch Resistance gram to plow | Swell g/m$^2$ |
|---|---|---|---|---|---|
| 1 (control) | 0 | 0 | 0.75 | 27.5 | 39.9 |
| 2 (control) | 0 | 0 | 1.5 | 51.25 | 27.1 |
| 3 (control) | 0 | 0 | 3.0 | 92.5 | 19.3 |
| 4 | 10 | 107 | 1.5 | 61.5 | 22.1 |
| 5 | 20 | 107 | 1.5 | 65 | 22.0 |
| 6 | 30 | 107 | 1.5 | 67.5 | 1836 |
| 7 | 40 | 107 | 1.5 | 70.25 | 19.8 |
| 8 | 10 | 70 | 1.5 | 68.75 | 23.2 |
| 9 | 20 | 70 | 1.5 | 69.25 | 22.5 |
| 10 | 30 | 70 | 1.5 | 71.25 | 19.2 |

The invention has been described in detail with particular reference preferred embodiments thereof, but it will be understood that variations modifications can be effected within the spirit and scope of the invention.

What is claimed is:

1. A coating composition comprising at least gelatin and colloidal alumina particles, the particles being less than 0.2 micrometers.

2. A coating composition according to claim 1 wherein the alumina particles are less than 0.15 micrometers.

3. A coating composition according to claim 1 wherein the alumina particles are less than 0.10 micrometers.

4. A coating composition according to claim 1 wherein the alumina particles are about 0.04 micrometers.

5. A coating composition according to claim 1 wherein the alumina particles are present at 5–60 weight percent with respect to gelatin.

6. A coating composition according to claim 1 wherein the alumina particles are present at 20 to 45 weight percent with respect to gelatin.

7. A coating composition according to claim 1 wherein the alumina particles are present at 10 to 50 weight percent with respect to gelatin.

8. A coating composition according to claim 1 wherein the alumina particles are γ-alumina particles with Mohs hardness greater than 6.

9. A coating composition according to claim 1, further comprising addenda selected from hardeners, surfactants, couplers, silver salts, and dyes.

10. A coating composition according to claim 9 wherein the addendum is a hardener.

11. A coating composition according to claim 10 wherein the hardener is present at 0.01 to 30 weight percent based on the weight of dried gelatin.

12. A coating composition according to claim 10 wherein the hardener is present at 0.05 to 20 weight percent based on the weight of dried gelatin.

13. A coating composition according to claim 10 wherein the hardener is present at 0.1 to 1.5 weight percent based on the weight of dried gelatin.

14. A coating composition according to claim 10 wherein the hardener is bis vinyl sulfonyl methane.

15. A coating composition according to claim 1, coated on a photographic element.

16. An imaging element comprising a support and at least one imaging layer also containing, in any gelatin containing layer, colloidal alumina particles less than 0.2 micrometers.

17. The imaging element of claim 16 wherein the alumina filled gelatin is in the uppermost layer, in the layer directly superposed on the support, or in an interlayer.

18. The imaging element of claim 16 wherein the alumina filled gelatin is in a nonimaging layer directly superposed on the support.

19. A method of increasing the wet strength of a coated gelatin layer comprising the steps of:

providing alumina particles having an average size of less than 0.2 micrometers;

adding the alumina particles to gelatin at a pH between 3.5 and 7.0 to form a coating composition;

adjusting the pH of the composition to a level required for coating; and coating the composition on a support.

20. The method of claim 19 wherein addenda are added to the composition prior to coating.

21. The method of claim 19 wherein the alumina particles are added to the gelatin at a pH of less than 4.5.

* * * * *